United States Patent [19]

Mineck et al.

[11] 4,245,289

[45] Jan. 13, 1981

[54] POWER SUPPLY MONITOR

[75] Inventors: David W. Mineck, Cedar Rapids; Glen E. Mohr, Walker, both of Iowa

[73] Assignee: Rockwell International Corporation, El Segundo, Calif.

[21] Appl. No.: 954,394

[22] Filed: Oct. 25, 1978

[51] Int. Cl.³ .............................................. H02P 13/18
[52] U.S. Cl. ...................................... 363/41; 307/234; 363/26; 363/56
[58] Field of Search ....................... 363/25, 26, 41, 55, 363/56, 57, 96, 97; 323/17, DIG. 1; 340/659; 307/234

[56] References Cited

U.S. PATENT DOCUMENTS

| | | | |
|---|---|---|---|
| 3,483,455 | 12/1969 | Klysa et al. | 340/659 |
| 3,660,680 | 5/1972 | Grundy | 340/659 |
| 3,838,294 | 9/1974 | Leete | 340/659 |
| 3,870,943 | 3/1975 | Weischedel et al. | 363/26 |
| 3,959,714 | 5/1976 | Mihelich | 323/17 |
| 4,002,963 | 1/1977 | Hunter | 363/44 |

*Primary Examiner*—William H. Beha, Jr.
*Attorney, Agent, or Firm*—Terry M. Blackwood; Richard A. Bachand; H. Fredrick Hamann

[57] ABSTRACT

In a duty cycle modulated power regulating apparatus, loss of regulation is anticipated by monitoring the duty cycle of the regulating means.

16 Claims, 7 Drawing Figures

POWER SUPPLY MONITOR

This invention relates to electrical power supplies and to the detection of loss or impending loss of regulation.

As is well known by those skilled in the art, there are several types of systems where erroneous system operation can occur if the system is not properly controlled or shut down prior to a power failure or intermittency. That is, depending on the type of load to which power is being supplied, it is often desirable to anticipate loss of power supply regulation early enough to prevent adverse load reaction. As merely one example, if the power supply load is a digital computer, a sufficiently early anticipation of imminent regulation loss can be used to prevent loss of data in volatile memories. For instance, said early detection can be used to store said data in nonvolatile memories or to switch the computer to an auxiliary supply.

For typical pulse width modulated regulator designs, prior art techniques of predicting regulation loss have centered around monitoring the primary voltage source; i.e., either the AC line voltage or the unregulated DC voltage. (Pulse width modulated regulation and duty cycle regulation are commonly used interchangeably and, as is also intended herein, refer to the same principles in power regulation.) Monitoring the AC line voltage however requires modeling the energy storage function in terms of charge and discharge rates. These terms can become complex under varying operating conditions such as repetitive short power interrupts. To keep the modeling hardware practical, it is usually simplified and the time constants are adjusted to cover the worst-case condition. This is done at the expense of taking advantage of less of the available stored energy or in effect reducing the time of a power interrupt duration that results in an interrupt of the regulated output by asserting a power failure warning earlier than is usually necessary. That is, due to the limitation of such monitors, the system is often immune only to very short power interrupts and thus frequently causes unnecessary load interrupts even when sufficient stored energy remains. Other common drawbacks of such monitors comprise the requirement of a large energy storage capability and the attendant space and power requirements.

An improvement in monitoring can be achieved by monitoring the unregulated DC input to the regulator. This eliminates the need to model charge and discharge rates, the component tolerances of such circuitry, and the margin allowed for circuitry simplification. Some allowance must still be made however for the tolerances of the converter parts and their response rates.

In accordance with the present invention an even further improvement in anticipating loss of regulation from a pulse width modulated or duty cycle regulator has been achieved by monitoring duty cycle of the converter part of the power supply regulator. In addition to improved predictive capability, fewer and/or shorter load interrupts are incurred as the present invention takes fuller advantage of the system energy storage capability and makes the system immune to longer power interrupts.

These and other features, objects, and advantages of the invention will become more apparent upon reference to the following specification, claims, and appended drawings in which:

FIGS. 1b and 1c are block diagram schematics representing two different types of regulator portion of FIG. 1a;

Figure 1A:
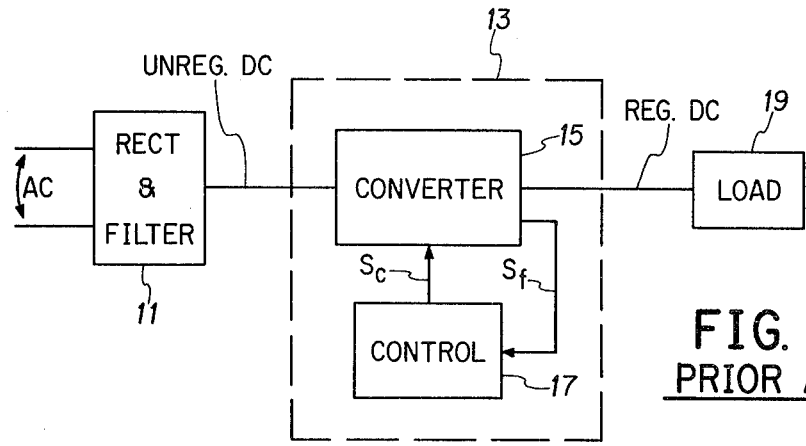
FIG. 1a is a block diagram schematic representing a typical prior art pulse width modulation regulated power supply.

Turning now to FIGS. 1a, b, and c for briefly reviewing pulse width or duty cycle modulated power regulation, in FIG. 1a is shown in generalized form a typical prior art pulse width modulation regulated power supply. Briefly, AC line voltage is rectified and filtered in 11 to provide unregulated DC voltage at the input of regulator 13. Within regulator 13 a portion of converter 15 is caused by a control signal $S_c$ from a control means 17 to alternately deliver and not deliver the unregulated DC at some predetermined circuit location. The signal at this location $S_{cv}$ is a pulse width or duty cycle modulated signal which is then reconverted to DC via rectification (if necessary) and filtering. Such DC is regulated DC and comprises the output of regulator 13 which is then fed to the load 19. Control signal $S_c$ and thus the condition of converter 15 and the state of $S_{cv}$ are dependent upon a feedback signal $S_f$ from converter 15.

Figure 1B:
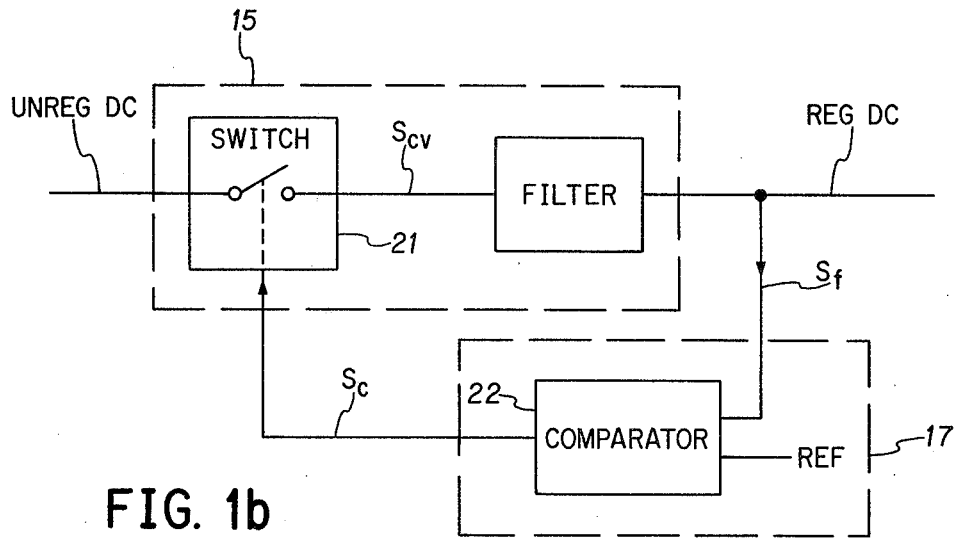
Figure 1C:
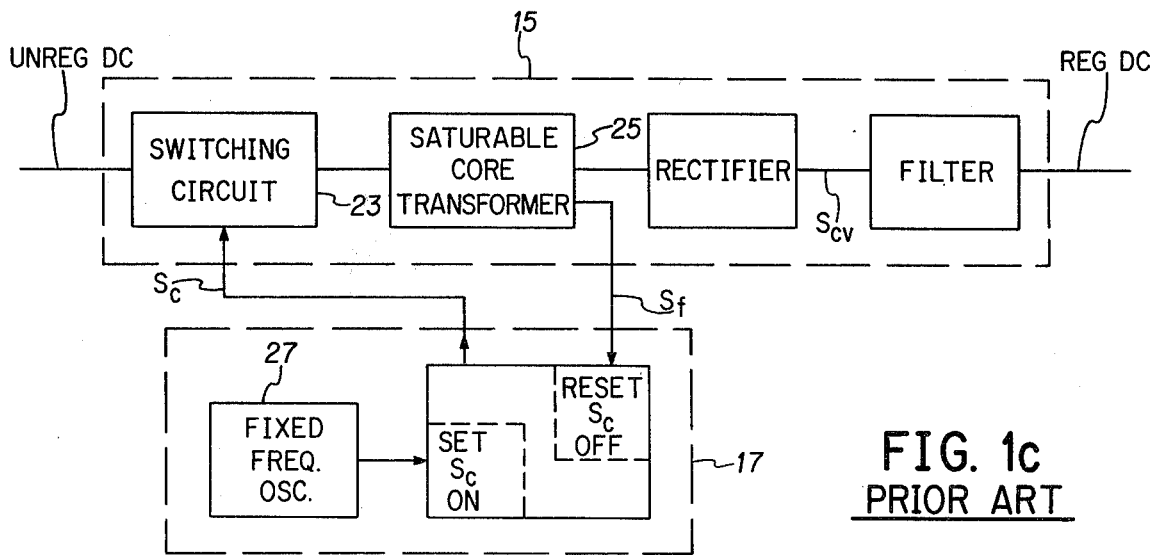

FIGS. 1b and 1c show two different but well-known types of the FIG. 1a regulator 13. FIG. 1b represents a series switch regulation apparatus wherein, in response to $S_c$, switch or pass element 21 opens or closes to produce $S_{cv}$. $S_c$ is derived via comparison in 22 of a reference level with $S_f$ (which in FIG. 1b is the regulated DC) and $S_c$ usually exhibits the same duty cycle as $S_{cv}$. FIG. 1c represents a type of duty cycle regulator after which, for instance, the apparatus of U.S. Pat. No. 3,219,906 is patterned. Briefly, a switching circuit 23 (usually a push-pull arrangement), under the control of $S_c$, connects or disconnects the primary of a saturable core transformer 25 (usually center tapped) to unregulated DC, and the unrectified form of the duty cycle modulated signal $S_{cv}$ is outputted at the transformer secondary (also usually center tapped). The "on" interval of $S_{cv}$ is usually initiated by a fixed frequency oscillator 27 and terminated when the transformer core saturates. $S_f$ is derived from the transformer so as to indicate saturation and is usually used to open the closed switch in 23 or otherwise ensure that the converter 15 is prevented from free-running.

As mentioned hereinabove, prior art techniques of predicting regulation loss from duty cycle modulated regulator designs have focused upon the monitoring of the AC line voltage or upon the monitoring of the unregulated DC voltage. One technique of unregulated DC monitoring is shown in U.S. Pat. No. 3,969,635. However, and as also earlier mentioned, the present invention focuses upon the monitoring of the regulator duty cycle.

Figure 2:
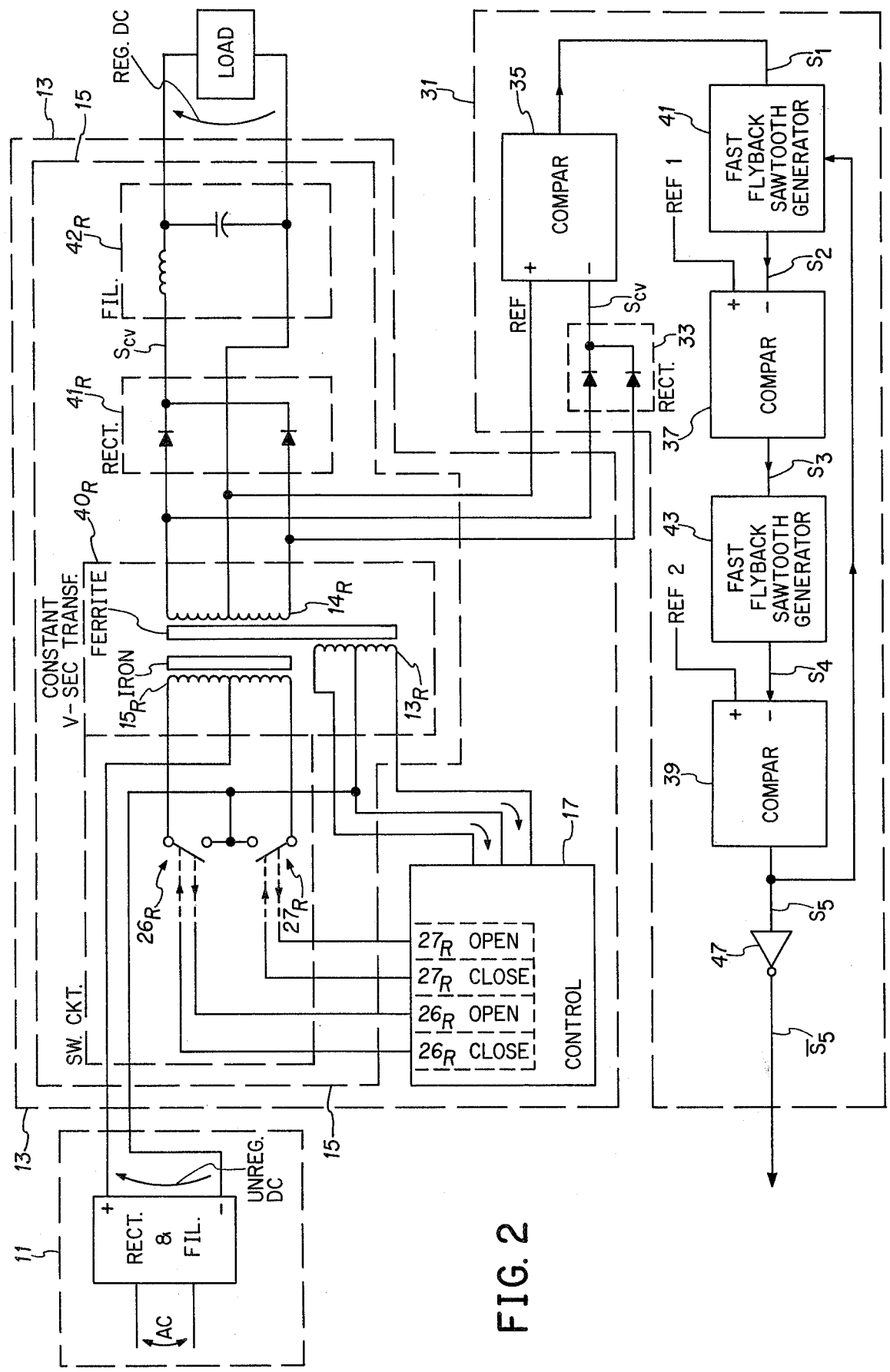
FIG. 2 is a schematic illustrating the presently preferred embodiment.
Figure 3:
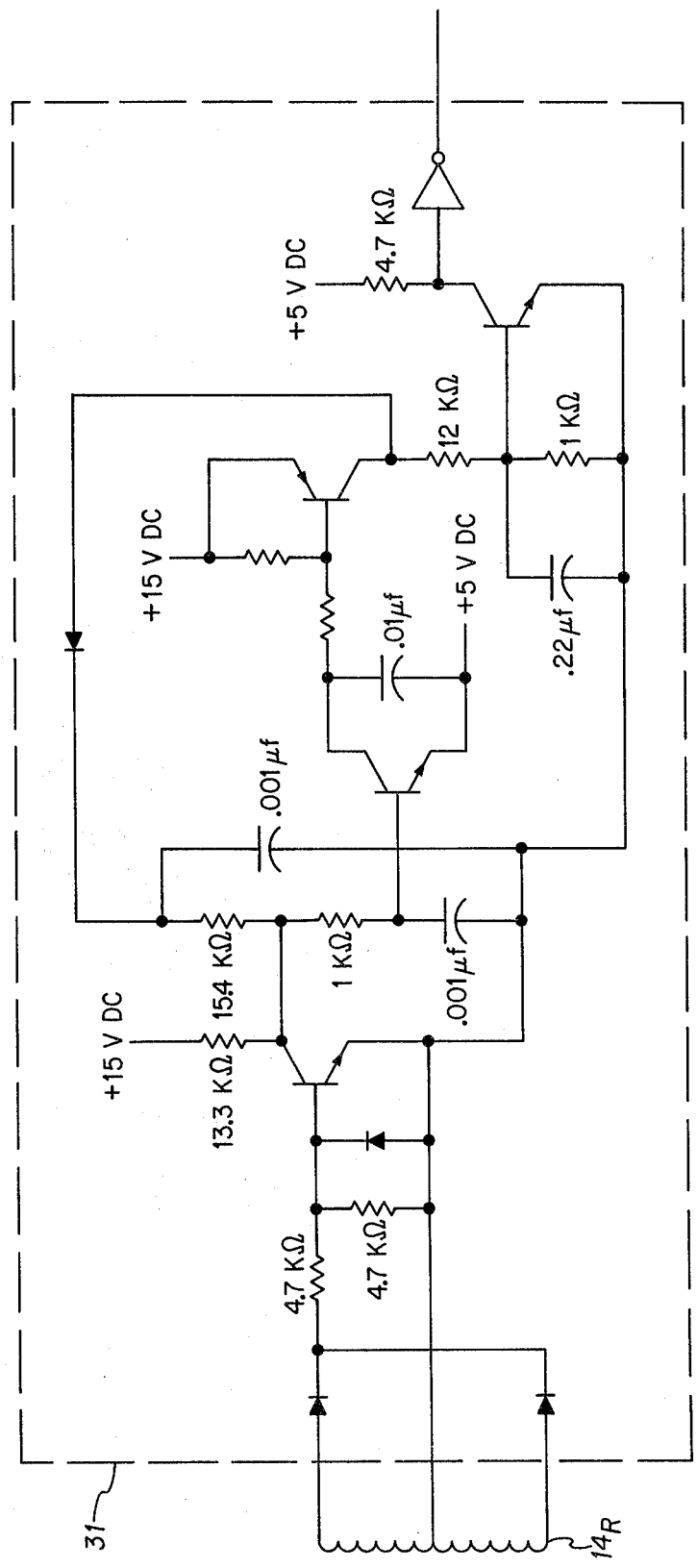
FIG. 3 is a circuit diagram showing a portion of FIG. 2 in more detail.

Turning now to FIG. 2, the presently preferred embodiment comprises a duty cycle regulator 13, receiving unregulated DC from supply 11, and duty cycle monitor 31. Supply 11 comprises a conventional rectifier circuit receiving AC line voltage, and, following said rectifier, a conventional LC filter and energy storage circuit. The duty cycle regulator 13 falls generally into the class of devices of which FIG. 1c hereinabove is representative. More particularly, the presently preferred implementation of regulator 13 is the same as that shown in FIG. 4 of U.S. Pat. No. 3,660,751 (assigned to the assignee hereof) and is described in more detail in said patent. For a more complete presentation, the teachings of said U.S. Pat. No. 3,660,751 are hereby incorporated by reference into the present disclosure. Corresponding reference numerals are employed where practical and herein bear an added subscript R. Monitor 31 receives its input from the secondary of transformer $14_R$, and comprises a rectifier circuit 33 followed by comparators 35, 37, and 39 with which are interdigitated two fast flyback sawtooth generators 41 and 43. The presently preferred implementation of monitor 31 is shown in greater detail in FIG. 3.

Figure 4:
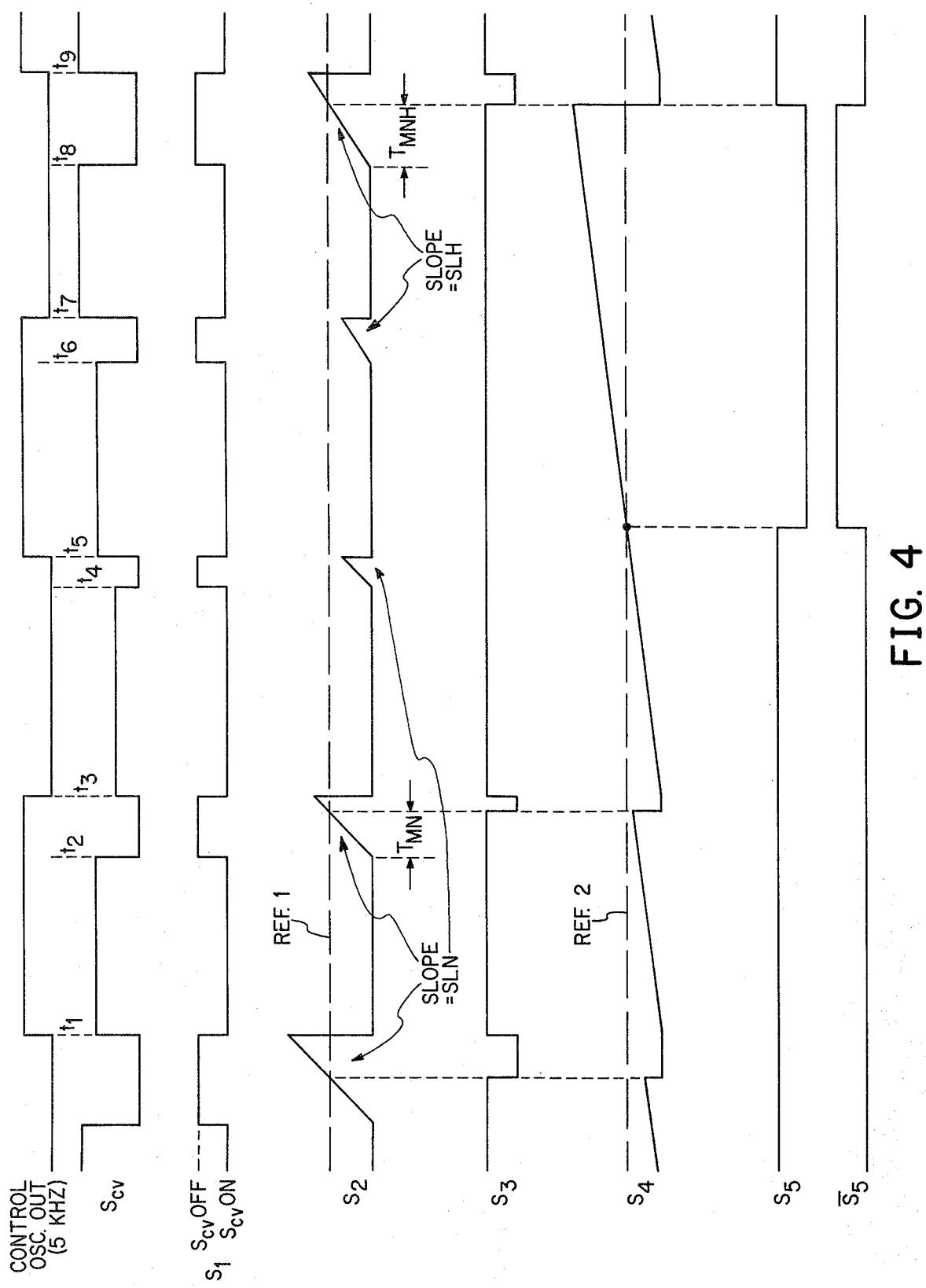
FIG. 4 shows waveforms useful in explaining the operation of the FIG. 2 apparatus.

With simultaneous reference now to both FIGS. 2 and 4, the oscillator portion of control unit 17 synchronizes the operation of converter 15. Switches $26_R$ and $27_R$, under the control of unit 17 alternately connect the unregulated DC to, and disconnect same from, the primary winding $15_R$ of transformer $40_R$. More particularly, at time $t_1$ the control oscillator causes switch $26_R$ to close and to thus apply the unregulated DC to the upper half of center tapped winding $15_R$. Switch $26_R$ remains closed until $t_2$ whereupon, aided by feedback from winding $13_R$, switch $26_R$ opens and remains so until the oscillator half cycle beginning at $t_5$. At the oscillator half cycle beginning at $t_3$ however, the control oscillator causes switch $27_R$ to close and to thus apply the unregulated DC to the lower half of center tapped winding $15_R$. Switch $27_R$ remains closed until $t_4$ whereupon, aided by feedback from winding $13_R$, switch $27_R$ opens and remains so until the oscillator half cycle beginning at $t_9$. Switches $26_R$ and $27_R$ continue to operate in similar alternating manner so that for every half cycle of the oscillator waveform, a constant volt second product is produced and a constant average voltage is achieved at the transformer secondary winding $14_R$. For instance, if the unregulated DC voltage decreases in magnitude, the saturable core portion of the transformer saturates at a proportionally later time such that the product of voltage and time remains constant. The constant volt second product output on secondary $14_R$ following rectification is designated in the FIGS. as $S_{cv}$ and same when filtered produces the regulated DC for driving the load.

In accordance with the presently preferred monitor embodiment, the three connections from secondary winding $14_R$ are tapped to provide the input to monitor 31. The secondary winding signal is rectified in a separate rectifier 33 to reproduce $S_{cv}$ which is then fed to one input of a comparator circuit 35 whose reference input comprises the center tap of $14_R$. Comparator 35 serves to convert $S_{cv}$ into a signal $S_1$ wherein the $S_{cv}$ off time is represented by a fixed high level and $S_{cv}$ on time is represented by a fixed low level. When the output $S_1$ goes high, the output $S_2$ of sawtooth generator 41 starts to ramp upward according to a predetermined RC time constant $\tau_1$ and when $S_1$ goes low, $S_2$ rapidly goes low (according to a time constant $\tau_2 << \tau_1$) and remains low until the next high state of $S_2$.

In comparator 37, wherein $S_2$ is compared to a predetermined reference, comparator 37 output $S_3$ goes low when $S_2$ exceeds the comparator 37 reference and $S_3$ goes high when $S_2$ is less than the comparator 37 reference.

The response $S_4$ of sawtooth generator 43 to $S_3$ is much like the response of sawtooth generator 41 to $S_1$ except that a much slower charging rate is used; i.e., the charging time constant $\tau_3$ of generator 43 is greater than $\tau_1$. Examination of the FIG. 4 waveforms reveals that when $S_{cv}$ is off for too short a time (the $t_4$ to $t_5$ interval) $S_2$ does not reach the pertinent reference level, $S_3$ does not go low, and $S_4$ is not prevented from ramping through the Ref. 2 level. When $S_4$ exceeds the Ref. 2 level, comparator 39 output $S_5$ goes low, $\overline{S_5}$ (from inverter 47) goes high and same is used to annunciate anticipated loss of regulation.

Also, the preferred embodiment is made hysteretic by incorporating feedback from the output of comparator 39 so as to decrease the slope of generator 41 output from the original rate SLN to a slower rate SLH when $S_5$ goes low. When the off time of $S_{cv}$ increases sufficiently to permit the slower ramp part of $S_2$ to exceed REF. 1, $S_5$ returns high and the slope of generator 41 output $S_2$ reverts to the SLN rate. The Ref. 1 level and SLN rate are chosen to represent a maximum permissible duty cycle of $S_{cv}$ on time per oscillator half cycle, the exceeding of which causes an alarm and/or controls using equipment. SLH is selected to represent some lesser duty cycle to which the system is restricted before the monitor trips back to the no-alarm condition. Also, the Ref. 1 level in conjunction with the slope SLN may be considered as establishing a minimum or reference time duration $T_{MN}$ above which the $S_{cv}$ off time must remain to avoid causing an alarm condition. Likewise, the Ref. 1 level in conjunction with the slope SLH may be considered as establishing a minimum time duration $T_{MNH} > T_{MN}$ above which the $S_{cv}$ off time must return to remove the alarm condition.

Other details of the presently preferred embodiment are as follows: control oscillator frequency is typically 5 kHz; slope of $S_2$ fast ramp (SLN) is typically 0.5 volts per microsecond; slope of $S_4$ ramp is typically 0.025 volts per microsecond; Ref. 1 is typically 3.33 volts; slope of $S_2$ slow ramp (SLH) is typically 0.25 volts per microsecond; Ref. 2 is typically 3.33 volts.

It should be noted that the preferred duty cycle monitor actually monitors the converter 15 off time and produces an alarm condition when this off time becomes too short. Since the operation is synchronized by a fixed frequency oscillator such that each converter on-off cycle is a constant (i.e., is equal to a half cycle of the fixed frequency oscillator) it is not necessary in the preferred embodiment, in order to monitor duty cycle, to either monitor total on-off cycle times or to ratio detect the on (or off) time relative to the total cycle time. Moreover, duty cycle is generally thought of as a ratio $RT_1 = T_{on}/T_{cy}$ where $T_{cy}$ is the time interval of one on-off cycle and $T_{on}$ is the on time part of said cycle. However, the ratio $RT_2 = T_{off}/T_{cy}$, where $T_{off} = T_{cy} - T_{on}$, comprises the complement of $RT_1$ (i.e., $RT_1 + RT_2 = 1$) and thus since one may be derived from the other, a monitoring of one of $RT_1$ or $RT_2$ is in effect a monitoring of the other.

Also, when as in the presently preferred embodiment one of $T_{on}$ or $T_{off}$ is substantially shorter than the other and the monitoring depends upon RC charging networks, it is advantageous to monitor the shorter one of the two since the error produced by tolerances of such monitoring circuitry are minimized. Thus, since in the presently preferred embodiment $T_{off}$ is typically much less than $T_{on}$ (i.e., typically $T_{off} < 10 T_{on}$), $T_{off}$ is monitored instead of $T_{on}$.

Figure 5:
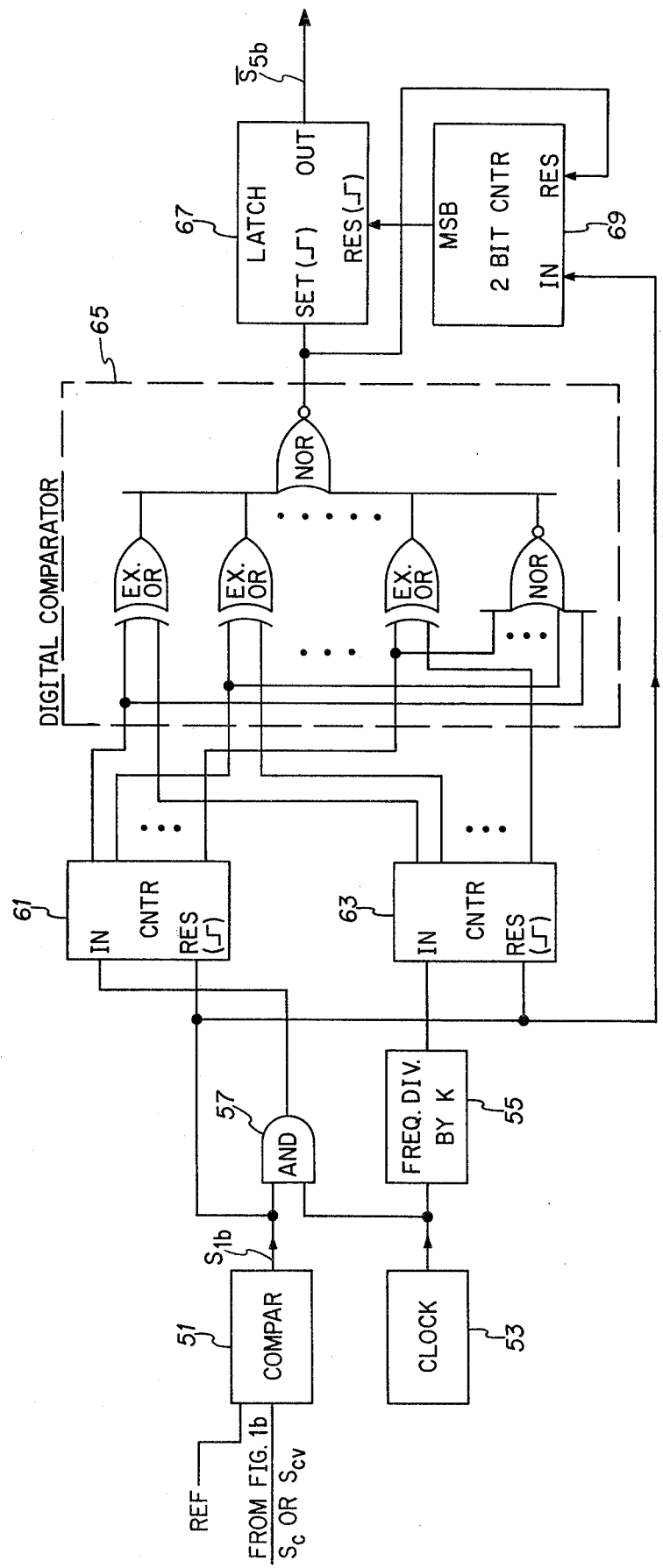
FIG. 5 is a schematic representing an alternative monitor embodiment.

It will be apparent to those skilled in the art that the principles of the present invention are not restricted to applications to the fixed frequency, FIG. 1c type of regulator. For example the FIG. 1b apparatus could be monitored as to duty cycle with an appropriate apparatus of which FIG. 5 is one example. In FIG. 5, the FIG. 1b apparatus is tapped at either comparator 22 output $S_c$ or switch 21 output $S_{cv}$ to drive a comparator 51 to produce a signal $S_{1b}$ much like the signal $S_1$ of FIGS. 2 and 4. A clock source 53 (whose frequency $\approx 10/T_{sp}$ where $T_{sp}$ is the shortest converter off time expected) drives a frequency divider 55 and, along with $S_{1b}$, is input to AND gate 57. Two identical counters 61 and 63, each reset to zero count by the positive going edge of $S_{1b}$, receive respectively the AND gate 57 output and the frequency divider 55 output. The outputs of counters 61 and 63 are compared in a digital comparator 65 and when the counts become equal (except for all zeros) an alarm condition is produced via the setting of latch 67 to indicate by $\bar{S}_{5b}$ going high that the maximum permissible duty cycle has been exceeded. K is chosen such that the maximum permissible duty cycle$=[1-(1/K)]$. Latch 67 may be reset by a logic circuit such as 69 which produces output only when two succeeding leading edges of $S_{1b}$ occur without an intervening output from digital comparator 65. Hysteresis could be added by reducing the value of K as a function of $\bar{S}_{5b}$ going high.

Thus while particular embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. Apparatus comprising (i) duty cycle modulated power regulating means for, in accordance with a duty cycle, alternately allowing, for a variable time $T_x$, and inhibiting, for a variable time $T_y$, contribution of an unregulated DC source to the regulating means output, said $T_x$ varying in response to variation in said unregulated DC source so that a substantially constant voltage-time area per $(T_x+T_y)$ interval is maintained at the regulating means output, and (ii) detection means for monitoring said duty cycle and providing a signal indicative of the value of said duty cycle.

2. Apparatus as defined in claim 1 wherein said signal indicative of the value of said duty cycle is a signal which changes from a first constant level to a second constant level upon the occurrence of said duty cycle exceeding a predetermined duty cycle value $M_1$.

3. Apparatus as defined in claim 2 wherein said signal indicative of the value of said duty cycle is a signal which, after having changed to said second constant level, changes back to said first constant level upon the occurrence of said duty cycle dropping back below a predetermined duty cycle value $M_2$.

4. Apparatus as defined in claim 3 wherein $M_2$ is not equal to $M_1$.

5. Apparatus as defined in claim 4 wherein $M_1$ is greater than $M_2$.

6. Apparatus as defined in claim 5 wherein said detection means is hysteretic, whereby, inequality between $M_1$ and $M_2$ is effected.

7. Apparatus as defined in claim 1 wherein each time interval $(T_x+T_y)$ equals $T_k$, where $T_k$ is a predetermined constant time interval, and said detection means for monitoring said duty cycle and providing a signal indicative of the value of said duty cycle comprises means for monitoring a predetermined one of times $T_x$ or $T_y$ and providing a signal indicative of the duration of the monitored one of $T_x$ or $T_y$.

8. Apparatus as defined in claim 7 wherein said signal indicative of the duration of the monitored one of $T_x$ or $T_y$ is a signal having a first constant level when the duration of the monitored one of $T_x$ or $T_y$ is less than a reference duration $T_f$ and having a second constant level when the duration of the monitored one of $T_x$ or $T_y$ is greater than said reference duration $T_f$.

9. Apparatus as defined in claim 8 wherein said detection means includes hysteresis providing means for altering the reference duration $T_f$.

10. Apparatus as defined in claim 7 wherein the predetermined one of times $T_x$ or $T_y$ is the one of $T_x$ or $T_y$ which is usually shorter than the other.

11. Apparatus as defined in claim 1 wherein each time interval $(T_x+T_y)$ equals $T_k$, where $T_k$ is a predetermined constant time interval, and said detection means for monitoring said duty cycle and providing a signal indicative of the value of said duty cycle comprises means for monitoring $T_y$ and providing a signal indicative of the duration of $T_y$.

12. Apparatus as defined in claim 11 wherein said signal indicative of the duration of $T_y$ is a signal which changes from a first constant level to a second constant level when $T_y$ becomes less than a reference duration $T_q$.

13. Apparatus as defined in claim 11 wherein said signal indicative of the duration of $T_y$ is a signal which changes from a first constant level to a second constant level when $T_y$ becomes less than a reference duration $T_q$ and thereafter changes back to said first constant level when $T_y$ becomes greater than a reference duration $T_p$.

14. Apparatus as defined in claim 13 wherein $T_p$ is not equal to $T_q$.

15. Apparatus as defined in claim 14 wherein $T_p$ is greater than $T_q$.

16. Apparatus as defined in claim 15 wherein said detection means is hysteretic, whereby, inequality between $T_p$ and $T_q$ is effected.

* * * * *